W. C. KROEGHER.
CAR TRUCK AND BRAKE MECHANISM.
APPLICATION FILED NOV. 4, 1912.
1,148,026.
Patented July 27, 1915.
3 SHEETS—SHEET 1.
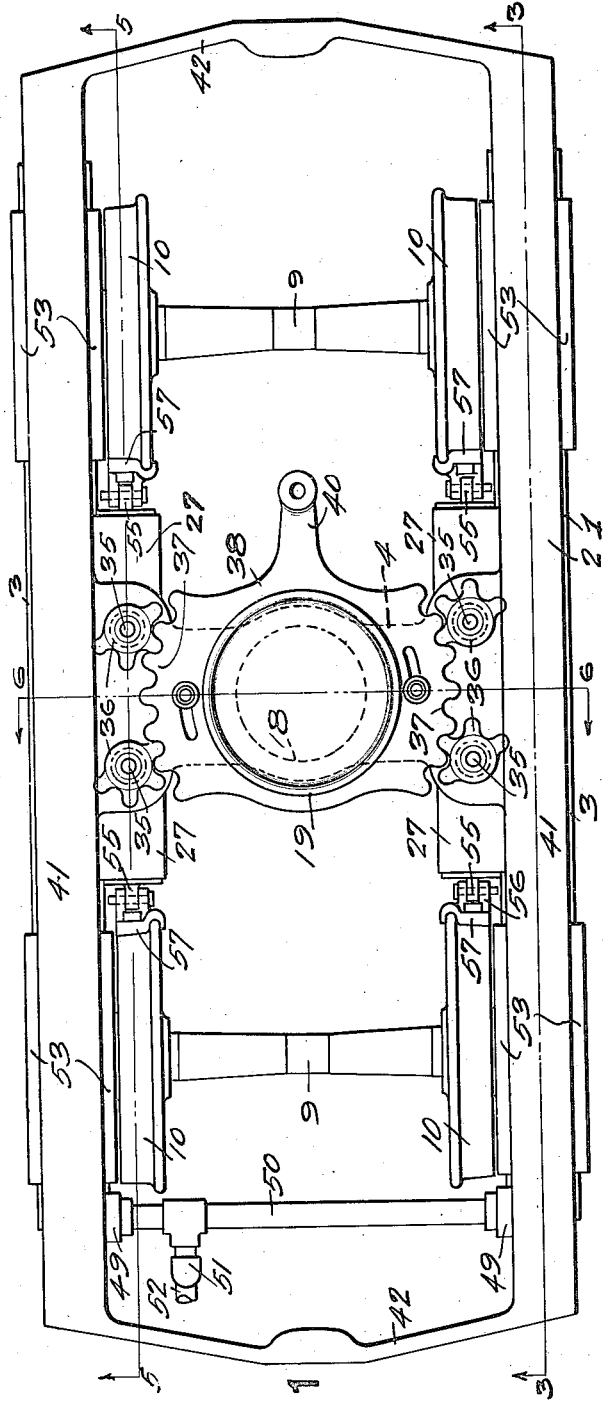
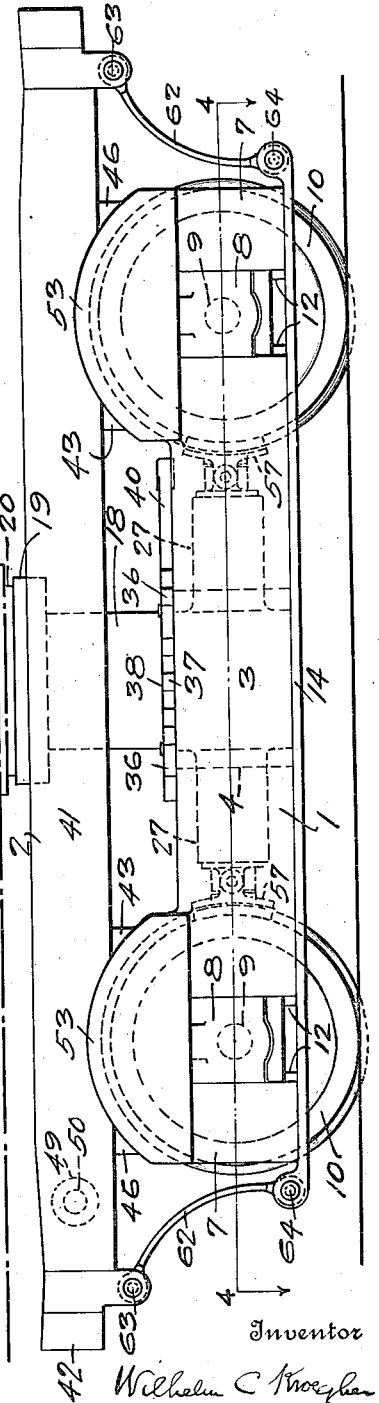

W. C. KROEGHER.
CAR TRUCK AND BRAKE MECHANISM.
APPLICATION FILED NOV. 4, 1912.

1,148,026.

Patented July 27, 1915.
3 SHEETS—SHEET 2.

Witnesses
J. R. Keller
Robert C. Totten

Inventor
Wilhelm C. Kroegher
By Kay & Totten
Attorneys

W. C. KROEGHER.
CAR TRUCK AND BRAKE MECHANISM.
APPLICATION FILED NOV. 4, 1912.
1,148,026.
Patented July 27, 1915.
3 SHEETS—SHEET 3.
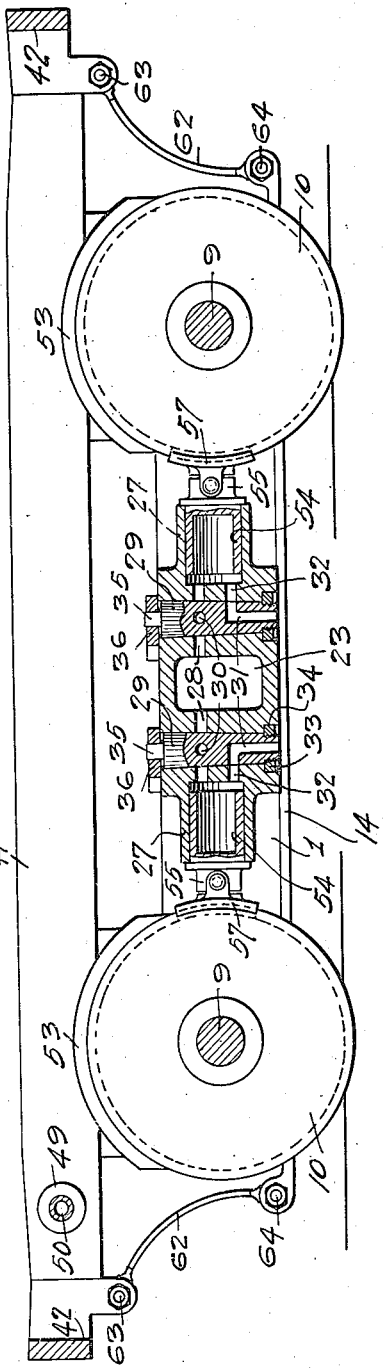
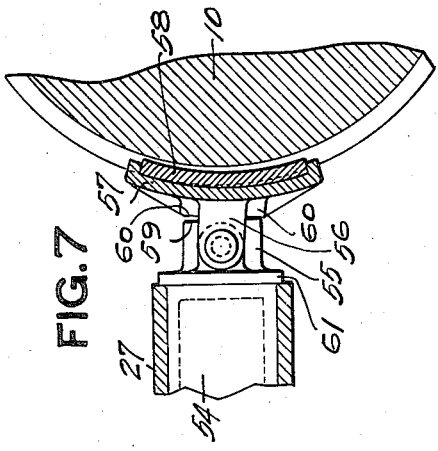
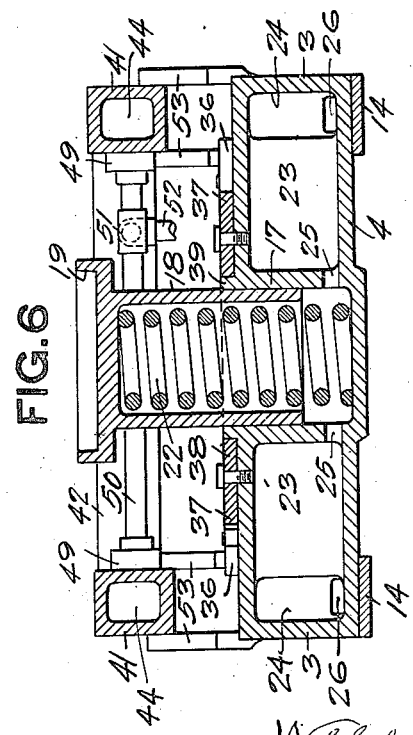

UNITED STATES PATENT OFFICE.

WILHELM C. KROEGHER, OF BELLEVUE, PENNSYLVANIA.

CAR TRUCK AND BRAKE MECHANISM.

1,148,026.      Specification of Letters Patent.      Patented July 27, 1915.

Application filed November 4, 1912. Serial No. 729,369.

*To all whom it may concern:*

Be it known that I, WILHELM C. KROEGHER, a citizen of the United States, and resident of Bellevue, in the county of Allegheny and State of Pennsylvania, have invented a new and useful Improvement in Car Trucks and Brake Mechanism; and I do hereby declare the following to be a full, clear, and exact description thereof.

My invention relates to trucks for railway cars, for street railways or steam railways, and is particularly concerned with improved constructions in the design of the truck itself, whereby great strength and simplicity is attained, and a further object is to provide improvements in the brake gear whereby the brakes may be applied by direct pneumatic pressure in which the truck frame is utilized as a pressure reservoir for the several brake cylinders, and is directly connected with the train or air pressure pipe.

A further object is to so arrange the various parts of the truck frame that air pressure therein will act as a pneumatic cushion for the car and on the other hand the weight of the car on the frame will serve to maintain high pneumatic pressure within the frame which may be instantly applied to the brakes.

A further object is to so arrange the brake applying and releasing means that in releasing the brakes only that portion of the air pressure within the brake cylinders will be exhausted or released without further reducing the pressure within the truck frame.

A further object is to provide universal brake applying and releasing means through which the brakes may be applied upon all the wheels of the truck uniformly and simultaneously and may be similarly released and in the releasing of the brakes the brake shoes will be withdrawn entirely from contact with the wheel while at the same time they will remain in a position sufficiently close to the wheel to be applied with very little lost motion.

With these objects in view, the invention consists in the constructions and arrangements of parts, a preferred embodiment of which is illustrated in the accompanying drawings, in which—

Figure 3:
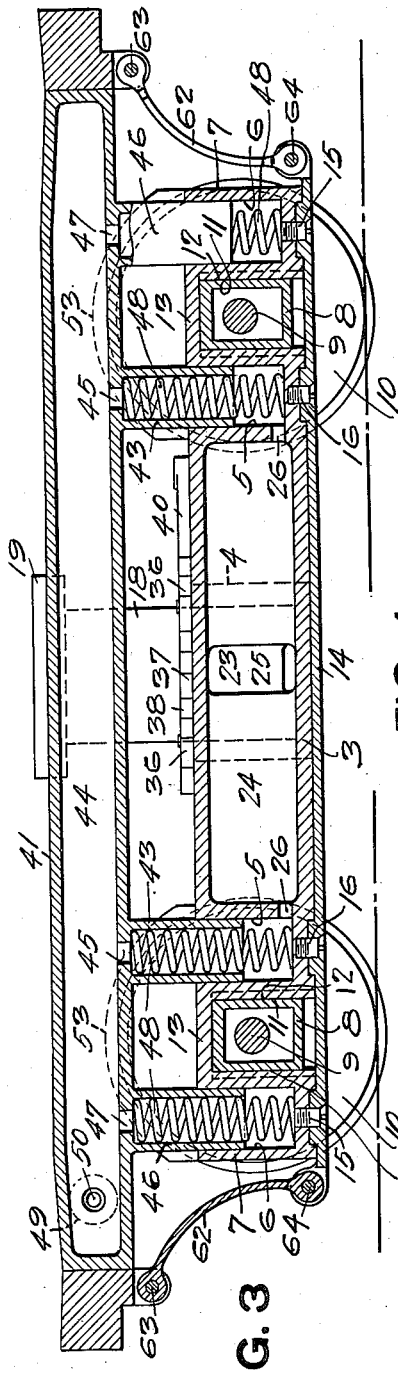
Figure 4:
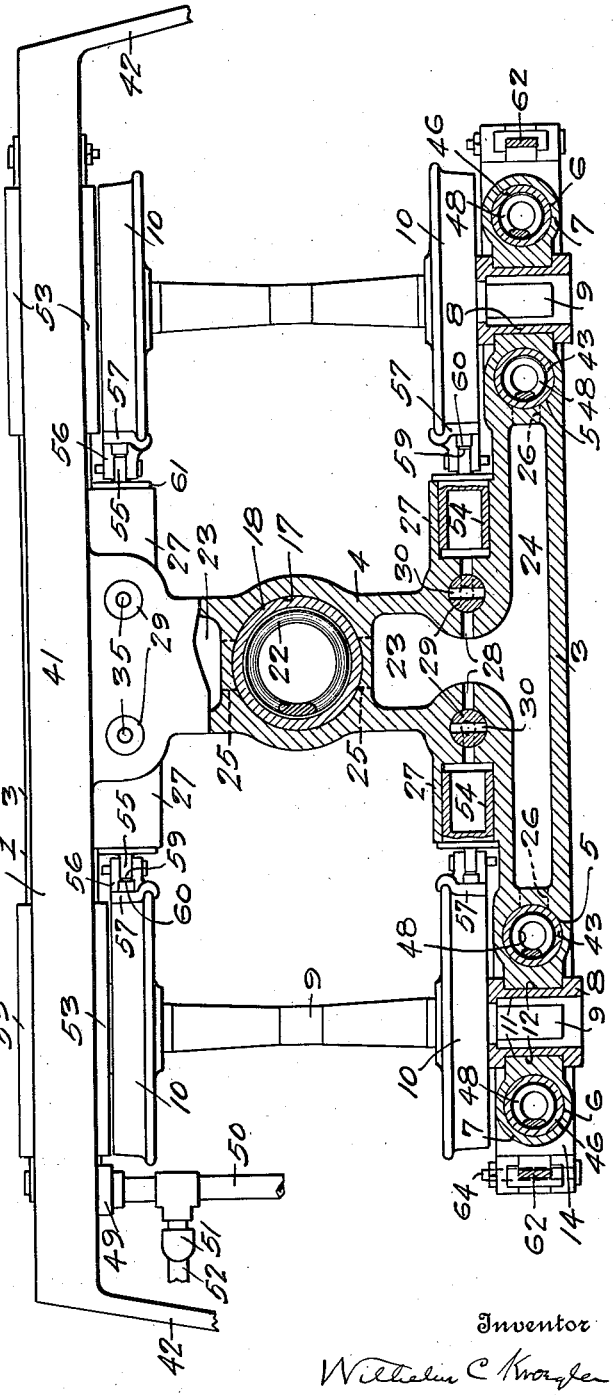

Figure 1 is a plan view of a truck embodying the improvements; Fig. 2 is a side elevation thereof; Fig. 3 is a longitudinal sectional view of one of the side members of the truck on the line 3—3, Fig. 1; Fig. 4 is a partial horizontal sectional and plan view on the line 4—4, Fig. 2; Fig. 5 is a longitudinal sectional view on the line 5—5 Fig. 1. Fig. 6 is a transverse sectional view on the line 6—6 Fig. 1; and Fig. 7 is a sectional view of a detail of the brake shoe construction and mounting.

In the embodiment of my invention herein selected for illustration, the truck comprises two main parts which I will designate respectively as the main frame 1 and the bearing frame 2. The main frame comprises the longitudinal side members 3, 3 which are connected centrally by the transverse bolster member 4. As seen in Figs. 3, 4 and 6, these side members and the bolster member are of hollow construction and may be cast in one piece or built up of steel plates. Formed integral with or forming a permanent part of the side members are the plunger cylinders 5, 5, 5, 5. At the outer ends of the side members are additional plunger cylinders 6, 6, 6, 6. These plunger cylinders 6 are formed on extensions 7 of the main truck side members and each plunger cylinder 6 is spaced from a plunger cylinder 5 sufficiently to form a housing for the journal boxes 8 which receive the wheel bearing which latter may be of any desired construction. The axles 9 of the wheels 10 are mounted in these journal boxes and the journal boxes are provided on either side with guideways 11 adapted to engage with guideways 12 formed on the facing sides of the plunger cylinders 5, 6, respectively. The journal boxes 8 at their upper sides preferably abut solidly against adjacent parts 13 Fig. 3 of the main truck frame. The lower ends of the outer plunger cylinders 6 are firmly reinforced by tie plates or beams 14 which are bolted to the lower ends of said plunger cylinders as at 15 and also to the main body of the main truck frame at intervals as at 6.

It will be seen therefore that in the preferred form of the invention there is no spring action between the journal boxes and the main truck frame and that said journal boxes are securely held against longitudinal movement in the frame by means of the housings as above described. The transverse or bolster member 4 of the main truck frame is provided with a central cylinder 17 adapted to receive the hollow center plate plunger 18 (Fig. 6) the head of which is flanged as at 19 to receive the usual bearing member 20 of the car body indicated by the line 21 (Fig. 2). Within the center plate plunger 18 is mounted a heavy spring 22 which supplies a spring seat for the center bearing member of the car body.

As will be seen from an inspection of Figs. 4 and 6 the hollow portions 23 of the bolster member communicate with the hollow portions 24 of the side members of the main truck frame and the hollow portions 23 of the bolster member communicate with the central cylinder 17 by passages 25, 25. The hollow portions of the side members 3 of the main truck frame also communicate with the plunger cylinders 5 by passages 26. On the inner side of each main truck frame side member and at either side of the junction therewith of the bolster member 4 are the brake cylinders 27 which communicate with the hollow interior of the main truck frame by means of passages 28, Figs. 4 and 5, interposed in these passages 28 are valve plugs 29 each having a transverse passage 30 which may be brought into alinement with the passages 28 to communicate the air pressure within the main truck frame to the brake cylinder. Each of these valve plugs also is provided with an exhaust passage 31 communicating with an exhaust passage 32 leading from the brake cylinder. These valve plugs are secured in place by means of nuts 33 on the externally threaded lower ends of the plugs, said nuts being seated in recesses 34 in the side members of the main truck frame, (see Fig. 5). The valve plugs are each provided with pintles 35 to which are secured pinions 36. These pinions 36 engage with arc shaped toothed racks 37 of a plate like lever 38 journaled on a flange 39 (Fig. 6) at the upper end of the central plunger cylinder 17. This valve lever 38 is provided with an actuating arm 40 which may be connected with any suitable form of actuating mechanism controlled from the platform of the car where the truck is applied to a street railway car, for example, or from the engine, where the truck is applied to a railway car. By the operation of this brake valve lever, the valve plugs may be rotated to bring the passages 30 into alinement with the passages 28 by which air pressure may be applied to the brake cylinders 27. The exhaust passage 31 of the valve plug extends longitudinally of the plug and then laterally to one side, this lateral or off-set portion being at right angles to the pressure passage 30, so that when the pressure passage is in communication with the brake cylinder, the exhaust passage is closed and conversely, when the exhaust passage communicates with the brake cylinder, the pressure passage is closed. Consequently the exhaust action exhausts only the pressures in the brake cylinders without further reducing the pressure in the truck frame. Before proceeding further with the detail construction of the brake mechanism the construction of the upper or bearing frame of the truck and its relation to the main frame will be described. This bearing frame comprises the hollow side members 41 and end members 42, the latter preferably solid and suitably bolted or otherwise secured to the side members. Referring particularly to Fig. 3 it will be seen that each side member is provided with the hollow open ended plungers 43 adapted to be seated in the plunger cylinders 5 of the main truck frame. Each of said plungers 43 communicates with the hollow interior 44 of the side members of the bearing member of the truck frame by passages 45. The side bearing members are also provided with additional hollow plungers 46 communicating with the interior of the side members 41 by passages 47. Within these plungers 43 and 46 are mounted bearing springs 48 which are seated respectively in the bottom of the plunger cylinders 5 and 6. At any convenient points on these side members 41 of the upper or bearing frame of the truck are pressure pipe connections and couplings 49 to which a suitable pressure pipe 50 is attached, which pipe in turn is connected by couplings 51 with a pipe 52 communicating with the source of air pressure. It will be seen therefore that the fluid pressure of the source of supply, whether a train system or a system adapted for a single car is communicated directly to the hollow members of the bearing frame of the truck and thence directly through the plungers 43, plunger cylinders 5 and passages 26 directly to the hollow interior of the main truck frame. This fluid pressure is communicated directly to the center bearing plunger cylinder 17 by means of the passages 25 and may be supplied under control of the valve plugs 29 directly to the brake cylinders 27.

From an inspection of Figs. 3 and 6, it is evident that the bearing frame of the truck has not only a spring bearing upon the main truck frame by reason of the side springs 48, but through the side plungers 43, 46 and through corresponding cylinders, the bearing frame has also a pneumatically cushioned bearing in the main truck frame, the pressure of this pneumatic bearing being supplied through the train or supply pipe 52. It is evident also from the construction and arrangement of the several bearing plungers that the weight of the car even when the air supply is cut off will maintain to a large extent a high pressure within the hollow truck frame members and particularly through the center bearing plunger 18 which acts as a pressure piston of considerable area within its plunger cylinder 17.

It is obvious that the side members 41 of the upper or bearing frame may be provided with suitable bearing plates to provide the usual side bearings for the car body. Suitable springs may be introduced between the side bearing plates and the side members of the bearing frame of the truck or between the side bearing plates on the car body and the body itself.

In order to hold the upper or bearing frame of the truck security in alinement with the lower or main frame thereof, the main frame is provided with vertical bearing plates 53 which embrace the outer and inner sides of the side members 41 of the upper bearing frame and between which said side members of the upper frame may vibrate more or less freely under varying pressures of the car body thereon. These vertical side bearing plates also relieve the plunger cylinders 5 and 6 and the plungers 43, and 46 from side thrust, which would tend to cause uneven wear upon them.

Returning to the brake mechanism proper and referring particularly to Figs. 5 and 7, within each of the brake cylinders 27 is mounted, a brake plunger or piston 54 having a lug 55 in which is pivoted a lug 56 of the brake shoe hanger 57 the latter having mounted therein the usual brake shoe 58. The outer end of the brake plunger lug 55 is provided with shoulders 59 and the brake shoe hanger is provided with shoulders 60 slightly spaced away from the shoulders 59 when the parts are assembled to allow slight tilting of the brake shoe hanger so that all parts of the brake shoe may be applied with uniform pressure to the wheel when the brakes are applied. The space between the shoulder 59 and 60 however is such that when the brakes are released neither end of the brake shoe will lie against the wheel and thereby be subjected to useless wear. The brake plunger 54 also is provided preferably with an annular shoulder 61 which limits the retractive action of the plunger whereby the brake shoe when released will always be held within a very short distance of the tread of the wheel, so that very limited movement of the brake plunger 54 is necessary to apply the brake.

In the operation of applying and releasing the brakes, the valve lever 38 is suitably turned to cause the valve plugs 29 to apply the pressure in the hollow truck frame to the brake cylinders 27 or on the other hand to shut off this pressure and to exhaust the pressure in the brake cylinders to the atmosphere. The valve passages in the valve plugs are so arranged that the air pressure from the source is cut off from the brake cylinders just before the exhaust takes place and conversely, of course, the exhaust is shut off just before the air pressure is applied. The sudden opening of the exhaust, however, by the turning of the exhaust passages into communication with the brake cylinders causes such a sudden escape of the pressure that a slight vacuum is produced in the brake cylinders, which causes the retraction of the brake plungers and thus releases the brakes. The restoring of atmospheric pressure in the brake cylinders through the exhaust passages after pressure has been relieved is not sufficient to again force out the brake plungers so that said plungers remain in retracted position until the next application of air pressure from the system.

In order to secure an extended spring bearing between the upper or bearing frame of the truck and the main frame thereof at the outer end of these frames so that any tendency of the upper frame to rock on the lower will be prevented, end springs 62 are connected to the outer ends of the upper bearing frame at 63 and to the main frame at 64. These springs reinforce the center bearing spring 22 and the side bearing springs 48 against the downward thrust of the weight of the car and resist any rocking tendency of the upper bearing frame of the truck upon the lower bearing frame. Furthermore, since these end springs 62 are positively secured both to the lower and upper frames, it is obvious that upon the rebound of the car and upper frame, these end springs will prevent excessive recoil action of the upper from the lower or main frame of the truck and since these end springs are normally bow-shaped, the tendency to this recoil action to straighten these springs will cause a spring resistance to this recoil action thus acting in the nature of a spring shock absorber between the upper and lower parts of the truck.

While I have herein described the particular embodiment of my invention, and the particular construction and relative arrangement of parts, it is obvious that the construction and arrangement may be altered within the scope of the appended claims.

What I claim is:

1. In a wheel truck, the combination of a hollow truck frame, of brake mechanism and means for applying pneumatic pressure through said truck frame to said brake mechanism.

2. In a wheel truck, the combination with a truck frame having air passages therein and a brake mechanism, means for applying fluid pressure through said passages to said brake mechanism.

3. In a wheel truck, a main truck frame, a bearing truck frame, each having air passages therein, brake mechanism mounted on said main truck frame and means for applying fluid pressure through said truck frames to said brake mechanism.

4. In a wheel truck, the combination with the main truck frame, a bearing frame having a spring bearing on said main frame, brake mechanism mounted on one of said frames, air passages in said frames communicating with said brake mechanism, and means for applying air pressure through said passages to said brake mechanism.

5. In a wheel truck, the combination with a truck frame having brake mechanism mounted thereon, said frame having air passages communicating with said brake mechanism, a center bearing having a plunger communicating with said air passages, means for applying air pressure through said passages to said brake mechanism, means whereby the weight of the car on said center bearing will aid to maintain fluid pressure within said frame.

6. In a wheel truck comprising a truck frame having air passages therein, a plurality of brake cylinders mounted on said frame and communicating with said passages, brake plungers in said cylinders and brake shoes carried by said plungers adjacent each wheel, means for applying pressure through said frame passages to said cylinders, and means for exhausting the fluid pressure in said cylinders to the atmosphere.

7. In a wheel truck, the combination with a main truck frame carrying wheel bearing houses and journal boxes, a plurality of brake mechanisms on said frame opposite each wheel, said frame having air passages communicating with said brake mechanism, a center bearing in said frame, means for communicating air pressure through said passages to said brake mechanism and means for causing said center bearing to aid in maintaining air pressure in said passages.

8. In a wheel truck, the combination of a main frame having wheel bearings and air passages therein, brake cylinders communicating with said air passages and carrying brake mechanisms adjacent said wheels, a bearing frame having air passages therein and so mounted upon said main frame as to have its air passages in communication with the air passages of the main frame, springs interposed between said frames, a source of air pressure connected with one of said frames, means for applying said air pressure to said brake cylinders to apply the brakes, and means whereby the pressure of the bearing frame upon said main frame will aid in maintaining air pressure within said air passages.

9. In a wheel truck, the combination with a main frame having air passages therein, brake cylinders communicating with said air passages and having brake mechanism adjacent each wheel, said main frame having a center bearing cylinder and having side bearing cylinders, a bearing frame having air passages therein and having side bearing plungers adapted to be seated within the said side bearing cylinders, said plungers communicating with the air passages within said bearing frame, springs interposed between said main and bearing frames, a source of fluid pressure communicating directly with the air passage of one of said frames to supply air pressure to said brake cylinders, and to form a cushion bearing for said bearing frame on said main frame, means for applying said fluid pressure through said air passages to said brake cylinders, the mounting of said bearing frame on said main frame causing the weight of said bearing frame and the car to aid in maintaining fluid pressure within said air passages.

10. In a wheel truck, the combination with a main frame having wheel bearings and air passages therein, a fluid pressure mechanism including a brake cylinder and plunger adjacent each wheel, a center bearing on said main frame, a plurality of side bearing plunger cylinders on said main frame, a bearing frame having air passages therein and having hollow plungers communicating with said air passages, said plungers adapted to be seated within said side bearing cylinders, means of communication between the air passages of said main frame and those of said bearing frame through said plunger cylinders and plungers, bearing springs interposed between said main and bearing frames, a source of fluid pressure connected directly with the said passages of one of said frames controlling valves for applying fluid pressure from said main frame to said brake cylinders the mounting of said bearing frame on said main frame serving to aid in maintaining fluid pressure within the air passages in said frames.

11. In a wheel truck, the combination with a main frame having wheel bearings and air passages therein, a plurality of brake mechanisms mounted on said main frame adjacent each wheel and including pressure cylinders communicating with said air passages and brake plungers, a center bearing in said main frame comprising a plunger cylinder communicating with said air passages and a center bearing plunger mounted in said cylinder said main frame having a plurality of said bearing plunger cylinders communicating with said air passages, a bearing frame having air passages therein and having hollow plungers communicating with said air passages and adapted to be seated in said plunger cylinders to afford communication between the air passages in said frames respectively, coil bearing springs mounted in said center bearing cylinder and in said side bearing cylinders, respectively, to form a spring bearing for said bearing frame on said main frame, a source of fluid pressure connected with one of said frames, whereby fluid pressure may be communicated to all of said air passages, valve controlled means to communicate said air pressure to said brake cylinders and to exhaust the pressure in said brake cylinders to the atmosphere, the mounting of the bearing frame on said main frame being such as to cause the weight of said bearing frame and the car body to aid in maintaining the fluid pressure within the air passages within said frames.

12. In a wheel truck, the combination with a main frame having wheel bearings and having air passages therein, of brake mechanism including plunger cylinders communicating with said air passages and plungers carrying shoes adjacent each wheel respectively, means for applying fluid pressure through said air passages to said cylinders to apply the brakes, means on said plungers and said brake shoes to permit said brake shoes to conform to the wheel tread when applied thereto, and means to prevent the brake shoe from lying in contact with the wheel tread when in retracted position.

13. In a wheel truck the combination with a main frame having wheel bearings and air passages therein, brake mechanism mounted on said frame and comprising brake cylinders communicating with said passages and brake plungers in said cylinders for applying the brakes to the wheel, a center bearing in said frame comprising a cylinder communicating with said passages and a center bearing plunger in said cylinder, and a spring interposed between said cylinder and said plunger, a plurality of plunger cylinders in said main frame communicating with said air passages, a bearing frame having air passages therein and having a plurality of hollow plungers communicating with said air passages and adapted to be seated in said plunger cylinders to connect the air passages of the bearing frame with those of the main frame, springs interposed between said plunger cylinders and said bearing frame, a source of fluid pressure communicating with one of said frames, the construction and arrangement being such that the center bearing plunger and the side bearing plungers may independently exert the pressure of the weight of the car on the body of air in said air passages whereby the said weight will aid in maintaining the air pressure within said passages.

In testimony whereof I the said WILHELM C. KROEGHER have hereunto set my hand.

WILHELM C. KROEGHER.

Witnesses:
ROBERT C. TOTTEN,
JOHN F. WILL.